US009622157B2

United States Patent
Wu et al.

(10) Patent No.: US 9,622,157 B2
(45) Date of Patent: Apr. 11, 2017

(54) NODE GROUPING METHOD, NODE, AND ACCESS POINT

(71) Applicant: Huawei Technologies Co., Ltd., Shenzhen, Guangdong (CN)

(72) Inventors: Tianyu Wu, Shenzhen (CN); Chen Chen, Xi'an (CN); Lina Zhu, Xi'an (CN); Changle Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 14/335,423

(22) Filed: Jul. 18, 2014

(65) Prior Publication Data
US 2014/0348087 A1 Nov. 27, 2014

Related U.S. Application Data
(63) Continuation of application No. PCT/CN2013/070746, filed on Jan. 21, 2013.

(30) Foreign Application Priority Data

Jan. 19, 2012 (CN) .......................... 2012 1 0017911

(51) Int. Cl.
*H04W 48/16* (2009.01)
*H04W 72/04* (2009.01)
(Continued)

(52) U.S. Cl.
CPC ............ *H04W 48/16* (2013.01); *H04W 24/10* (2013.01); *H04W 72/04* (2013.01); *H04W 72/121* (2013.01)

(58) Field of Classification Search
CPC ...... H04W 48/16; H04W 84/12; H04W 84/16
See application file for complete search history.

(56) References Cited

U.S. PATENT DOCUMENTS 5,708,969 A   1/1998  Kotzin et al.
7,522,540 B1*  4/2009  Maufer .................. H04L 45/18
                                                370/254
(Continued)

FOREIGN PATENT DOCUMENTS

CN    1338844 A    3/2002
CN    1700669 A   11/2005
(Continued)

OTHER PUBLICATIONS

"IEEE Standard for Information Technology—Telecommunications and information exchange between systems—Local and metropolitan area networks—Specific requirements, Part 11: Wireless LAN Medium Access Control (MAC) and Physical Layer (PHY) Specifications," IEEE Draft P802.11-REVmb/D12, pp. i-2782, Institute of Electrical and Electronics Engineers, New York, New York (Nov. 2011).

(Continued)

*Primary Examiner* — Paul H Masur
(74) *Attorney, Agent, or Firm* — Leydig, Voit & Mayer, Ltd.

(57) ABSTRACT

Embodiments of the present invention provide a node grouping method, a node, and an access point (AP). The method comprises: receiving a grouping request sent by an AP; according to the grouping request, obtaining a received signal strength indicator (RSSI); obtaining a group Identity (ID) of a group determined according to the RSSI. In the embodiment of the present invention, nodes are grouped according to the RSSI, so as to solve the problems of contention collision and low network performance in a large-scale network, avoid the problem of unfair throughput incurred by the near-far effect, and reduce the phenomena of hidden terminals.

22 Claims, 16 Drawing Sheets

(51) Int. Cl.
*H04W 72/12* (2009.01)
*H04W 24/10* (2009.01)

(56) References Cited

U.S. PATENT DOCUMENTS

| | | | |
|---|---|---|---|
| 2002/0022495 A1 | 2/2002 | Choi et al. | |
| 2003/0137993 A1 | 7/2003 | Odman | |
| 2005/0220131 A1 | 10/2005 | Ginzburg et al. | |
| 2005/0255847 A1 | 11/2005 | Han et al. | |
| 2006/0193284 A1 | 8/2006 | Stieglitz et al. | |
| 2011/0075578 A1* | 3/2011 | Kim | H04L 45/124 370/252 |
| 2013/0100942 A1* | 4/2013 | Rudnick | H04B 7/2656 370/337 |
| 2014/0242985 A1* | 8/2014 | Kneckt | H04W 48/16 455/434 |

FOREIGN PATENT DOCUMENTS

| | | |
|---|---|---|
| CN | 1738292 A | 2/2006 |
| CN | 1870550 A | 11/2006 |
| CN | 1938987 A | 3/2007 |
| CN | 101084605 A | 12/2007 |
| CN | 101099134 A | 1/2008 |
| CN | 101102178 A | 1/2008 |
| CN | 101119590 A | 2/2008 |
| CN | 101801081 A | 8/2010 |
| WO | WO 2007078177 A1 | 7/2007 |

OTHER PUBLICATIONS

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation," IEEE P802.11ah/D3.0, pp. i-583, Institute of Electrical and Electronics Engineers, New York, New York (Oct. 2014).

"IEEE Standard for Local and metropolitan area networks, Part 15.4: Low-Rate Wireless Personal Area Networks (LR-WPANs)," IEEE Std P802.15.4-2011, pp. i-294, Institute of Electrical and Electronics Engineers, New York, New York (Sep. 5, 2011).

Ting et al., "GDCF: Grouping DCF for the MAC layer enhancement of 802.11," Proceedings of the IEEE 2006 Global Telecommunications Conference, San Francisco, California, Institute of Electrical and Electronics Engineers, New York, New York, (Nov. 27-Dec. 1, 2006).

* cited by examiner

100

NODE GROUPING METHOD, NODE, AND ACCESS POINT

CROSS-REFERENCE TO RELATED APPLICATIONS

This application is a continuation of International Patent Application No. PCT/CN2013/070746, filed on Jan. 21, 2013, which claims priority to Chinese Patent Application No. 201210017911.6, filed on Jan. 19, 2012, both of which are hereby incorporated by reference in their entireties.

TECHNICAL FIELD

The present disclosure relates to the technical field of communication, and in particular to a node grouping method, a node and an access point.

BACKGROUND

With the development of communication technology, new requirements are proposed for the wireless network technology, i.e., a new generation of Wireless Fidelity (abbreviated as Wi-Fi) network of high rate, large scale and high throughput is required. The existing standard series of the Institute of Electrical and Electronics Engineers (abbreviated as IEEE) provide three channel access functions, including a Distributed Coordination Function (abbreviated as DCF), a Point Coordination Function (abbreviated as PCF) and a Hybrid Coordination Function (abbreviated as HCF). The DCF of Carrier Sense Multiple Access with Collision Avoidance (abbreviated as CSMA/CA), which is simple and convenient to be implemented, is a basic access mechanism and is used widely. As an optional access mechanism, PCF is based on DCF and performs centralized management on data transmission via a Point Coordinator (abbreviated as PC). HCF is a combination of DCF and PCF, and is used by a node which has Quality of Service (abbreviated as QoS) requirement. Therefore, the existing 802.11 IEEE standard series are based on contention. However, in a large scale network environment, the number of nodes which contend the channels at the same time is increased rapidly, thereby resulting in severe contention failure and thus lowering the network efficiency. In addition, the problem of hidden terminals in the wireless network may be more severe in the large scale network. It is indicated by a research that, in a network with infrastructure, the probability that any two nodes within the coverage area of a central node are hidden terminals is 41%. The problem of hidden terminals may become more severe with the increase of the network scale. If a delivery rate is 99% in a network without hidden terminal, the delivery rate is reduced to 94% in a network with hidden terminals of 5%. Therefore, the problem of hidden terminals is to be solved or alleviated urgently in a large scale network.

In view of this, the conventional technology can not satisfy people's new requirement on the wireless network, especially for the large scale network. Therefore, an appropriate solution is required to solve the problems brought by the large scale network.

SUMMARY

A method for grouping a node is provided according to embodiments of the disclosure, to solve problems such as contention conflict and low network efficiency in a large scale network, and reduce probability of hidden terminals.

In one aspect, a method for grouping a node is provided, including: receiving a grouping request sent from an Access point (AP); acquiring a Received Signal Strength Indicator (RSSI) based on the grouping request; and acquiring an Identity (ID) of a group that the node belongs to determined based on the RSSI.

In another aspect, a method for grouping a node is provided, including: sending to a node a grouping request, so that the node acquires a Received Signal Strength Indicator (RSSI) based on the grouping request; and acquiring an Identity (ID) of a group that the node belongs to determined based on the RSSI.

In another aspect, a method for grouping a node is provided, including: receiving a group joining request sent from a first node; sending a first grouping poll to each node in a first set of nodes based on the group joining request, where the first set of nodes is composed of a grouped node in nodes served by an Access point (AP); receiving a first grouping acknowledgement sent from each node in a second set of nodes, where the second set of nodes is composed of a node that monitors the group joining request in the first set of nodes; receiving a two-way neighbor node list sent from the first node, where the two-way neighbor node list includes a third set of nodes which is composed of a node corresponding to the first grouping acknowledgement monitored by the first node; and grouping the first node based on the two-way neighbor node list.

In another aspect, a method for grouping a node is provided, including: sending to an Access point (AP) a group joining request, so that the AP sends a first grouping poll to each node in a first set of nodes based on the group joining request and receives a first grouping acknowledgement sent from each node in a second set of nodes, where the first set of group is composed of a grouped node in nodes served by the AP, and the second set of nodes is composed of a node that monitors the group joining request in the first set of nodes; monitoring the first grouping acknowledgement sent from each node in the second set of nodes to the AP; and sending a two-way neighbor node list to the AP, where the two-way neighbor node list includes a third set of nodes which is composed of a node corresponding to the first grouping acknowledgement that is monitored.

In another aspect, a node is provided, including: a first receiving module, configured to receive a grouping request sent from an Access point (AP); a first acquisition module, configured to acquire a Received Signal Strength Indicator (RSSI) based on the grouping request received by the first receiving module; and a second acquisition module, configured to acquire an Identity (ID) of a group that the node belongs to determined based on the RSSI acquired by the first acquisition module.

In another aspect, an access point is provided, including: a first sending module, configured to send to a node a grouping request, so that the node acquires a Received Signal Strength Indicator (RSSI) based on the grouping request; and a first acquisition module, configured to acquire an Identity (ID) of a group that the node belongs to determined based on the RSSI.

In another aspect, an access point is provided, including: a first receiving module, configured to receive a group joining request sent from a first node; a first sending module, configured to send a first grouping poll to each node in a first set of nodes based on the group joining request received by the first receiving module, where the first set of nodes is composed of a grouped node in nodes served by the Access point (AP); a second receiving module, configured to receive the first grouping acknowledgement sent from the second set of nodes, where the second set of node is composed of a node that monitors the group joining request sent from the first sending module in the first set of nodes; a third receiving module, configured to receive a two-way neighbor node list sent from the first node, where the two-way neighbor node list includes a third set of nodes, and the third set of nodes is composed of a node corresponding to the first grouping acknowledgement monitored by the first node; and a first grouping module, configured to group the first node based on the two-way neighbor node list received by the third receiving module.

In another aspect, a node is provided, including: a first sending module, configured to send to an Access point (AP) a group joining request, so that the AP sends a first grouping poll to each node in a first set of nodes based on the group joining request and receives a first grouping acknowledgement sent from each node in a second set of nodes, where the first set of nodes is composed of a grouped node in nodes served by the AP, and the second set of nodes is composed of a node that monitors the group joining request in the first set of nodes; a first monitoring module, configured to monitor the first grouping acknowledgement sent from each node in the second set of nodes to the AP; and a second sending module, configured to send a two-way neighbor node list to the AP, where the two-way neighbor node list includes a third set of nodes which is composed of a node corresponding to the first grouping acknowledgement monitored by the first monitoring module.

Based on the foregoing technical solutions, in the node grouping method, node and access point according to the embodiments of the disclosure, by grouping the node based on RSSI, the problems such as contention conflict and low network efficiency in the large scale network may be solved, and unfair throughput caused by near-far effect may be avoided, thereby reducing the probability of hidden terminals.

BRIEF DESCRIPTION OF THE DRAWINGS

In order to clearly illustrate the technical solutions of embodiments provided by the disclosure, drawings to be used in the disclosure of the embodiments or the prior art will be briefly described in the following. Obviously, the drawings described in the following are only some of embodiments of the disclosure, and those skilled in the art may obtain other drawings based on these drawings without any creative work.

DESCRIPTION OF EMBODIMENTS

The technical solutions according to the embodiments of the disclosure will be described clearly and completely in conjunction with the drawings of the embodiment of the disclosure. Obviously, the disclosed embodiments are only some but not all of embodiments of the disclosure. Other embodiments obtained by those skilled in the art without any creative work based on the embodiments of the disclosure fall within the protection scope of the disclosure.

It should be understood that, the technical solutions in the embodiments of the disclosure are applicable to various of communication systems, such as a Global System for Mobile Communications (abbreviated as GSM) system, a Code Division Multiple Access (abbreviated as CDMA) system, a Wideband Code Division Multiple Access (abbreviated as WCDMA) system, a General Packet Radio Service (abbreviated as GPRS), a Long Term Evolution (abbreviated as LTE) system, a LTE Frequency Division Duplex (abbreviated as FDD) system, a LTE Time Division Duplex (abbreviated as TDD) system and a Universal Mobile Telecommunications System (abbreviated as UMTS).

Figure 1:
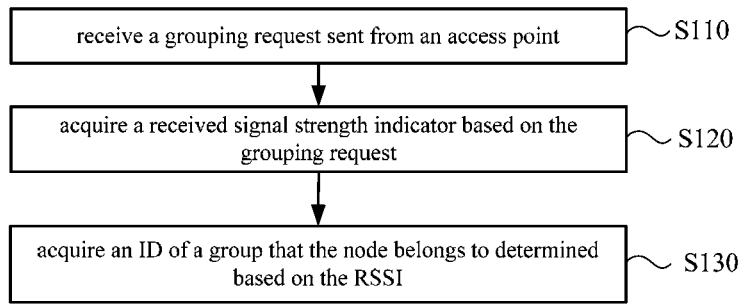
FIG. 1 is a schematic flow chart of a method for grouping a node provided according to an embodiment of the disclosure.

FIG. 1 is a schematic flow chart of a method 100 for grouping a node provided according to an embodiment of the disclosure. The method 100 may be implemented by a node (a station STA). As shown in FIG. 1, the method includes steps 110, 120 and 130 as follows.

S110 may include receiving a grouping request sent from an Access Point (abbreviated as AP).

S120 may include acquiring a Received Signal Strength Indicator (abbreviated as RSSI) based on the grouping request.

S130 may include acquiring an Identity (abbreviated as ID) of a group that the node belongs to determined based on the RSSI.

After receiving the grouping request sent from the AP, the node may acquire the RSSI based on the grouping request and thus acquire the ID of the group that the node belongs to.

Therefore, in the method for grouping the node provided according to the embodiment of the disclosure, by grouping the node based on the RSSI, the problems such as contention conflict and low network efficiency in the large scale network may be solved, and unfair throughput caused by near-far effect may be avoided, thereby reducing the probability of hidden terminals.

In addition, in an embodiment of the disclosure, by grouping the node based on the RSSI, the power may be controlled based on the actual situation, an uplink-downlink scheduling transmission reference may be provided for a power-saving protocol, and collision degree may be reduced by combining a directional antenna with a Multi-User Multiple Input Multiple Output (abbreviated as MU-MIIMO) technology and system capacity may be increased.

An AP itself is a node in a WiFi network, and the AP may be regarded as a special station STA or may be a central node for managing and controlling in the network. In an embodiment of the disclosure, the node may be an AP or other nodes, which may be determined based on the actual situation, and the embodiment of the disclosure is not limited thereto.

Figure 2:
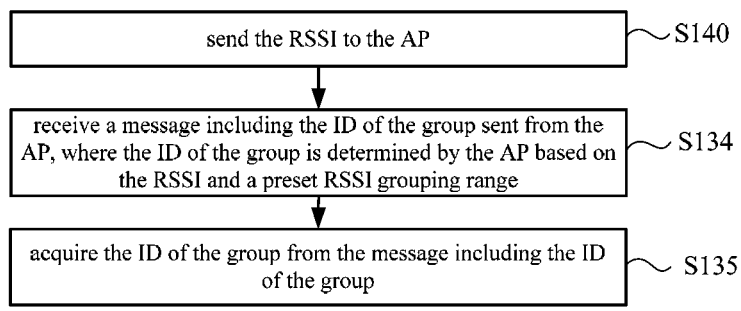
FIG. 2 is a schematic flow chart of a method for grouping a node provided according to another embodiment of the disclosure.

In an embodiment of the disclosure, as shown in FIG. 2, before acquiring the ID of the group that the node belongs to determined based on the RSSI in S130, the method 100 may further include a step 140 as follows.

S140 may include sending the RSSI to the AP.

Correspondingly, the acquiring the ID of the group that the node belongs to determined based on the RSSI in S130 may include steps 134 and 135 as follows.

S134 may include receiving a message including the ID of the group sent from the AP, where the ID of the group is determined by the AP based on the RSSI and a preset RSSI grouping range.

S135 may include acquiring the ID of the group from the message including the ID of the group.

That is, after acquiring the RSSI based on the grouping request sent from the AP, the node may sent to the AP the RSSI; and after receiving the RSSI sent from the node, the AP may determine the ID of the group that the node belongs to based on the RSSI and a preset RSSI grouping range. For example, if the RSSI belongs to the RSSI grouping range of a certain group, the group is determined as the one that the node belongs to. After determining the ID of the group that the node belongs to, the AP may send to the node a message including the ID of the group, and then the node may acquire the ID of the group that the node belongs to based on the message including the ID of the group.

In an embodiment of the disclosure, the preset RSSI grouping range is a RSSI range which can be grouped into each group. For example, the RSSI of a certain node is 2, and the preset RSSI grouping range is defined as follows: 1≤ the RSSI range of a first group <3, 3≤ the RSSI range of a second group <5, and 5≤ the RSSI range of a third group <7; the node may be grouped into the first group since the RSSI of the node is 2, which is in the RSSI range of the first group.

Figure 3:
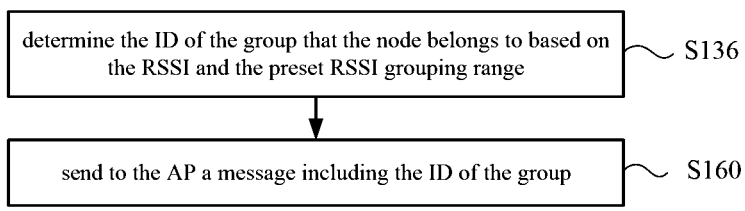
FIG. 3 is a schematic flow chart of a method for grouping a node provided according to another embodiment of the disclosure.

It may be understood that, the foregoing preset range of each group is only an example, which is not limited to the disclosure, and the specific preset range of each group may be determined according to actual situation. In an embodiment of the disclosure, as shown in FIG. 3, the acquiring an ID of a group that the node belongs to determined based on the RSSI in S130 includes a step 136 as follows.

S136 may include determining the ID of the group that the node belongs to based on the RSSI and the preset RSSI grouping range.

For example, in a case that the RSSI belongs to the RSSI range of a certain group, the group may be determined as a group that the node belongs to.

The method may further include a step 160 as follows.

S160 may include sending to the AP a message including the ID of the group.

For example, the node may send to the AP the message including the ID of the group that the node belongs to within a period of time determined based on the ID of the group that the node belongs to, a Distributed Coordination Function Inter-frame Space (abbreviated as DIFS) and a minimum value of Contention Window (abbreviated as CW) CWmin. For example, the time when the AP sends the ID of the group that the node belongs to may be determined based on the following formula (1).

$$T = ID*DIFS + random(0, CWmin) \quad (1)$$

where T is the determined sending time.

It should be understood that, the foregoing formula (1) is only an example, which is not limited to the embodiment of the disclosure, and the reporting time of the node may be determined based on other formulas. For example, supposing that the IDs of the groups are respectively 1, 2, 3, 4, 5, the node may determine the reporting time based on the following formula (2).

$$T = (ID-4)*DIFS + random(0, CWmin) \quad (2)$$

Alternatively, after the ID of the group that the node belongs to is determined, the node may send the ID of the group to the AP by carrying the ID of the group in the uplink data reported for the first time within a period of time specified by the AP in a Contention Period (abbreviated as CP).

Therefore, in the embodiment of the disclosure, signaling conflict may be reduced by decentralizing the time when the node reports the ID of the group that the node belongs to.

Figure 4A:
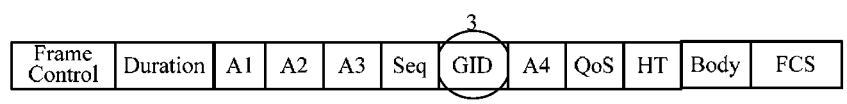
FIG. 4A and FIG. 4B are format charts of a MAC frame provided according to an embodiment of the disclosure.
Figure 4B:
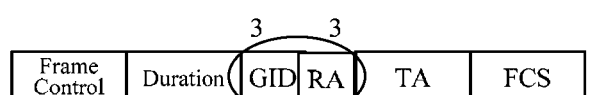

In an embodiment of the disclosure, the ID of the group may be sent to the AP via a MAC frame. For example, a domain for indicating the ID of the group that the node belongs to may be added into a frame head of a Medium Access Control (abbreviated as MAC) frame, and the domain may be referred to as a GID domain for convenience in an embodiment of the disclosure. For example, as shown in FIG. 4A, a GID domain of 3 bytes is added into the frame head of a MAC data frame. In sending information from the node to the AP, since the AP is unique, 6 bytes in a Receiver address (abbreviated as RA) for indicating a target address is unused, so certain bytes, such as the 3 bytes shown in FIG. 4B, may be selected from the RA field in the frame head of the MAC control frame to indicate the ID of the group that the node belongs to. It should be understood that, the 3 bytes shown in FIGS. 4A and 4B is only an example, and the GID domain may occupy bytes of other values, which may be determined according to actual situation. The MAC data frame shown in FIG. 4A further includes: a Frame Control, a Duration, an Address1 (abbreviated as A1), an Address2 (abbreviated as A2), an Address3 (abbreviated as A3), a Sequence (abbreviated as seq), an Address4 (abbreviated as A4), a Quality of Service (abbreviated as QoS), a High Through (abbreviated as HT), a body and a Frame Check Sequence (abbreviated as FCS). The MAC control frame in FIG. 4B further includes: a Frame Control, a Duration, a RA, a Transmit (abbreviated as TA) and a FCS. The specific meanings of these fields may refer to the conventional technology, and the description thereof is omitted herein for concision.

Figure 5:
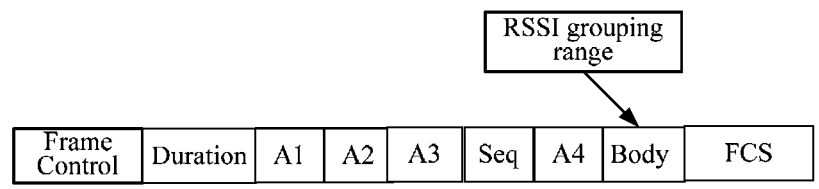
FIG. 5 is a format chart of a beacon frame provided according to an embodiment of the disclosure.

In an embodiment of the disclosure, the preset RSSI grouping range may be determined by negotiation between the node and the AP in advance. For example, the RSSI grouping range may be determined by negotiation when the node and the AP are associated. Alternatively, the preset RSSI grouping range may be informed to the node by the AP before the AP sends to the node a grouping request. Alternatively, the preset RSSI grouping range may be carried in a grouping request sent from the AP to the node, where the grouping request may be indicated by a beacon frame. For example, as shown in FIG. 5, the preset RSSI grouping range may be added into the body of the beacon frame. The beacon frame in FIG. 5 further includes: a Frame Control, a Duration, a A1, a A2, a A3, a Sequence, a A4, a body and a FCS. The specific meanings of these fields may refer to the conventional technology, and the description thereof is omitted herein for concision.

Therefore, the receiving a grouping request sent from an AP in S110 may include:

receiving the grouping request indicated by the beacon frame and sent from the AP, where the body of the beacon frame carries the preset RSSI grouping range.

In an embodiment of the disclosure, the preset RSSI grouping range may be set based on requirement or may be set automatically by the AP. For example, the preset RSSI grouping range may be determined based on, for example, tolerance of contention in the group, the number of nodes in the group and the RSSI value level of the group.

In an embodiment of the disclosure, the ID of the group that the node belongs to may be determined based on the RSSI and the preset RSSI grouping range in conjunction with other factors, such as location and energy information of the node. In an embodiment of the disclosure, the ID of the group that the node belongs to may be determined based on the RSSI and the preset RSSI grouping range, or the ID of the group that the node belongs to may be determined based on the RSSI of the node and the RSSIs of other groups. For example, the RSSIs of all the nodes may be acquired, and the nodes are averagely distributed to each group based on the RSSIs of all the nodes. Therefore, all solutions, as long as in which the ID of the group that the node belongs to is determined based on the RSSI, are within the protection scope of the disclosure.

The process of grouping provided according to the embodiment of the disclosure is described above, and the normal operation stage of the network after the nodes are grouped will be described in detail below.

Figure 6:
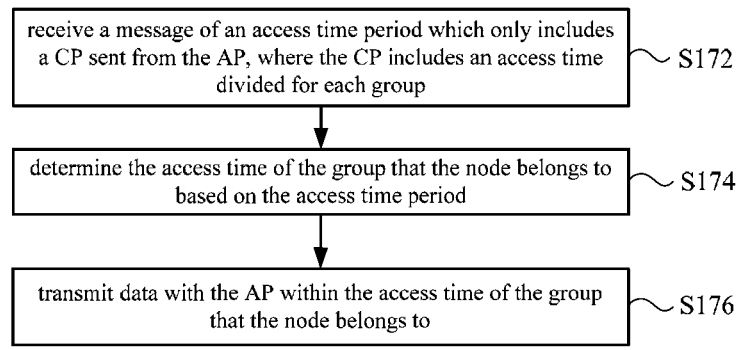
FIG. 6 is a schematic flow chart of data transmission provided according to an embodiment of the disclosure.

In an embodiment of the disclosure, as shown in FIG. 6, the method 100 may further include steps 172, 174 and 176 as follows.

S172 may include receiving, from the AP, a message of an access time period which only includes a CP, where the CP includes the access time divided for each group.

S174 may include determining the access time of the group that the node belongs to based on the access time period.

S176 may include transmitting data with the AP within the access time of the group that the node belongs to.

That is, the AP may determine the access time period after the grouping is finished. The access time period only includes the CP, and the CP includes the access time divided for each group. For example, the AP may determine the access time of each group based on the number of the nodes in each group, or the traffic of nodes in each group, or the number of nodes and the traffic of nodes in each group. After determining the access time period, the AP may send the access time period to the grouped nodes via a broadcast frame. After receiving the message including the access time period sent from the AP, the node may determine the access time of the group that the node belongs to based on the access time period, and thus the node may transmit data with the AP within the access time of the group that the node belongs to.

The access time period includes not only the CP and but also a Contention-Free Period (abbreviated as CFP), where the CFP is not used well. Therefore, in this embodiment, the access time period only includes a CP, thereby avoiding the CFP in the conventional technology, taking full use of time, and reducing the time cost.

Figure 7:
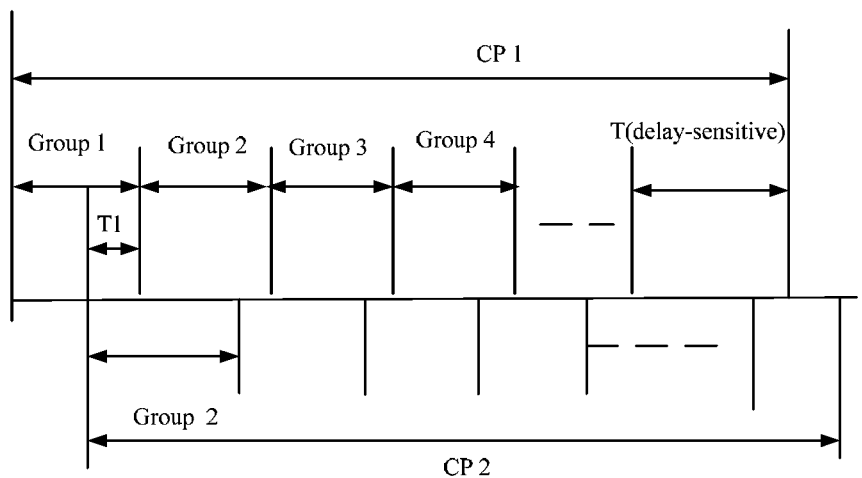
FIG. 7 is a schematic flow chart of a CP period provided according to an embodiment of the disclosure.

In an embodiment of the disclosure, the CP may only include the access time divided for each group, or the CP may include not only the access time divided for each group but also an access time which is not divided for any group. The access time which is not divided for any group may be used for transmitting delay-sensitive service. For example, as shown in FIG. 7, CP1 includes not only the access time divided for group 1, group 2, group 3, group 4 . . . , but also the time T for transmitting delay-sensitive service.

Figure 8:
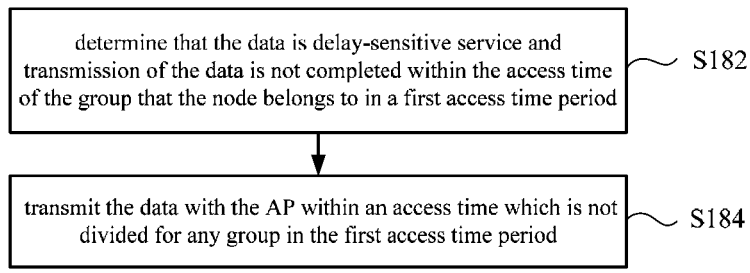
FIG. 8 is a schematic flow chart of data transmission provided according to another embodiment of the disclosure.

Therefore, in an embodiment of the disclosure, as shown in FIG. 8, the method may further include steps 182 and 184 as follows.

S182 may include determining that the data is delay-sensitive service and transmission of the data is not completed within the access time of the group that the node belongs to in a first access time period.

S184 may include transmitting the data with the AP within the access time which is not divided for any group in the first access time period.

That is, in a case that the node determines that the transmitted data is delay-sensitive service and the transmission of the data is not completed within the access time of the group that the node belongs to in the first access time period, the node may transmit the data with the AP within the access time which is not divided for any group in the first access time period.

Therefore, in an embodiment of the disclosure, the average end-to-end transmission delay of the delay-sensitive service may be reduced effectively by setting a time for transmitting the delay-sensitive service in the CP.

Figure 9:
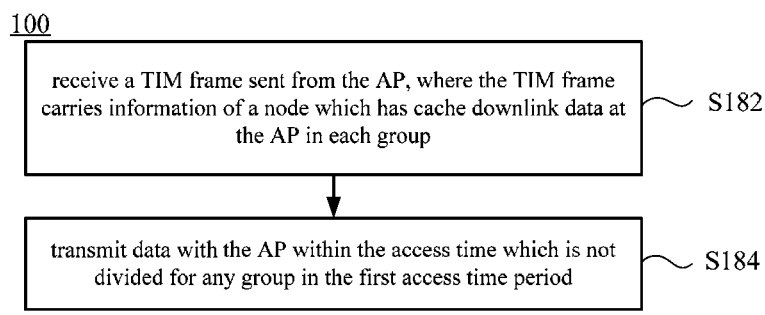
FIG. 9 is a schematic flow chart of data transmission provided according to another embodiment of the disclosure.

In an embodiment of the disclosure, as shown in FIG. 9, before transmitting the data with the AP within the access time of the group that the node belongs to, the method 100 may further include steps 192 and 194 as follows.

S192 may include receiving a Traffic Indication Map (abbreviated as TIM) frame sent from the AP, where the TIM frame carries information of the node which has cache downlink data at the AP in each group.

S194 may include determining that there is downlink cache data at the AP based on the TIM frame.

That is, the AP sends a TIM frame to the node based on the stored cache data about the grouped nodes. The TIM frame carries information of the node which has cache downlink data at the AP in each group. After receiving the TIM frame, the node acquires corresponding data from the AP if the node determines that it has cache downlink data at the AP based on the TIM.

Figure 10:
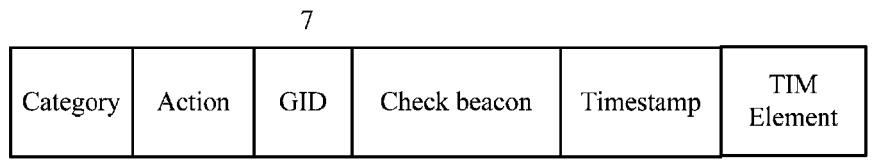
FIG. 10 is a format chart of a TIM frame provided according to another embodiment of the disclosure.

For example, as shown in FIG. 10, a GID domain may be added into the TIM frame. The GID domain in FIG. 10 has 7 bits, which may indicate 128 groups at most. The TIM frame in FIG. 10 further includes: a Category, an Action, a Check beacon, a Timestamp and a TIM element. The meaning of these fields may refer to the conventional technology, and detailed description thereof is omitted herein for concision.

Thus it can be seen that, the insufficient of partial virtual bitmap of the TIM frame can be solved by adding the domain for indicating the ID of the group that the node belongs to into the TIM frame.

Therefore, in the embodiment of the disclosure, by grouping the node based on the RSSI, the problems such as contention conflict and low network efficiency in the large scale network may be solved, and unfair throughput caused by near-far effect may be avoided, thereby reducing the probability of hidden terminals.

The method for grouping the node provided according to the embodiment of the disclosure is described from a perspective of node, and the method for grouping the node provided according to the embodiment of the disclosure may be described in the following from a perspective of AP.

Figure 11:
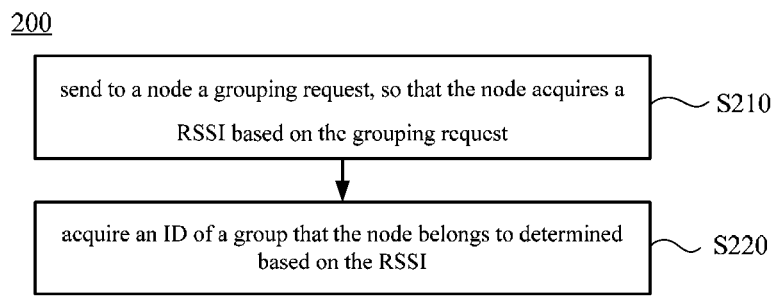
FIG. 11 is a schematic flow chart of a method for grouping a node provided according to another embodiment of the disclosure.

FIG. 11 is a method for grouping a node provided according to an embodiment of the disclosure. The method may be implemented by an AP. As shown in FIG. 11, the method 200 includes steps 210 and 220 as follows.

S210 may include sending to a node a grouping request, so that the node acquires a RSSI based on the grouping request.

S220 may include acquiring an ID of a group that the node belongs to determined based on the RSSI.

Therefore, in an embodiment of the disclosure, by grouping the node based on the RSSI, the problems such as contention conflict and low network efficiency in the large scale network may be solved, and unfair throughput caused by near-far effect may be avoided, thereby reducing the probability of hidden terminals.

In addition, in an embodiment of the disclosure, by grouping the node based on the RSSI, the power may be controlled based on the actual situation, an uplink-downlink scheduling transmission reference may be provided for a power-saving protocol, and collision degree may be reduced by combining a directional antenna with an MU-MIIMO technology and system capacity may be increased.

Figure 12:
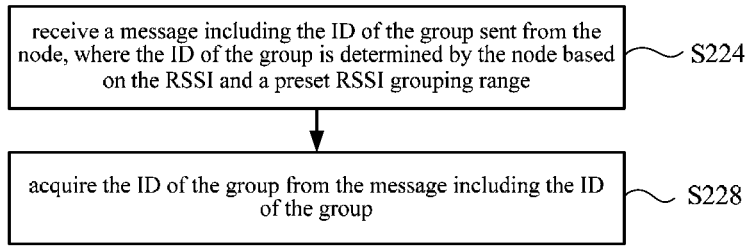
FIG. 12 is a schematic flow chart of a method for grouping a node provided according to another embodiment of the disclosure.

In an embodiment of the disclosure, as shown in FIG. 12, the acquiring the ID of the group that the node belongs to determined based on the RSSI in S220 may further include steps 224 and 228 as follows.

S224 may include receiving a message including the ID of the group sent from the node, where the ID of the group is determined by the node based on the RSSI and a preset RSSI grouping range.

S228 may include acquiring the ID of the group from the message including the ID of the group.

Figure 13:
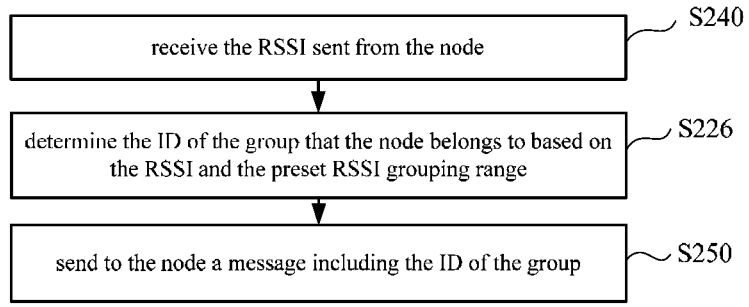
FIG. 13 is a schematic flow chart of a method for grouping a node provided according to another embodiment of the disclosure.

In an embodiment of the disclosure, as shown in FIG. 13, before acquiring the ID of the group that the node belongs to determined based on the RSSI in S220, the method 200 may further include a step 240 as follows.

S240 may include receiving the RSSI sent from the node.

Correspondingly, the acquiring the ID of the group that the node belongs to determined based on the RSSI in S220 includes a step 226 as follows.

S226 may include determining the ID of the group that the node belongs to based on the RSSI and the preset RSSI grouping range. For example, if the RSSI belongs to the RSSI grouping range of a certain group, the group is determined as the one that the node belongs to.

Correspondingly, the method further includes a step 250 as follows.

S250 may include sending to the node a message including the ID of the group.

In an embodiment of the disclosure, the preset RSSI grouping range may be determined by negotiation in advance or may be carried along with the sent grouping request. For example, the preset RSSI grouping range is carried in a beacon frame which indicates the grouping request.

Therefore, the sending the grouping request to an AP in S210 may include:

sending to the AP the grouping request indicated by a beacon frame, where the beacon frame carries the preset RSSI grouping range.

The process of grouping provided according to the embodiment of the disclosure is described above, and the normal operation stage of the network after the nodes are grouped may be described in detail below.

In an embodiment of the disclosure, the AP may send to the node an access time period which only includes a CP, where the CP includes the access time divided for each group, so that the node may transmit data with the AP within the access time of the group that the node belongs to.

Therefore, the access time period only includes the CP, thereby avoiding the CFP in the conventional technology, taking full use of time, and reducing the time cost.

In an embodiment of the disclosure, in a case that there is an idle of the sum of the DIFS and CWmin time, the AP may issue a grouping CP releasing message and re-send to the node the reset access time period, such as the CP2 shown in FIG. 7.

Therefore, the grouping access time is reset in a case that there is an idle in the group, thereby taking full use of time and reducing the time cost.

In an embodiment of the disclosure, the CP may further include an access time which is not divided for any group, so that in a case that the node determines that the data is delay-sensitive service and transmission of the data is not completed within the access time of the group that the node belongs to in a first access time period, the node may transmit the data with the AP within the access time which is not divided for any group in the first access time period, such as the time T in CP1 shown in FIG. 7. Therefore, in the embodiment of the disclosure, the average end-to-end transmission delay of the delay-sensitive service may be reduced effectively by setting a time for transmitting the delay-sensitive service in the CP.

In an embodiment of the disclosure, the AP may send to the node a TIM frame after determining that the grouping is completed, where the TIM frame carries information of the node which has cache downlink data at the AP in each group. For example, as shown in FIG. 10, a GID domain of 7 bits is added into the TIM frame.

Therefore, in the embodiment of the disclosure, a large number of nodes in the large scale network may be supported by setting a domain of an ID of a carrying group in the TIM frame for indicating, in conjunction with the virtual bitmap, which node in which group has cache data at the AP.

Therefore, in the embodiment of the disclosure, by grouping the node based on the RSSI, the problems such as contention conflict and low network efficiency in the large scale network may be solved, and unfair throughput caused by near-far effect may be avoided, thereby reducing the probability of hidden terminals.

Another method for grouping a node is further provided according to an embodiment of the disclosure. The method may be described in detail below in conjunction with FIG. 14 to FIG. 18.

Figure 14:
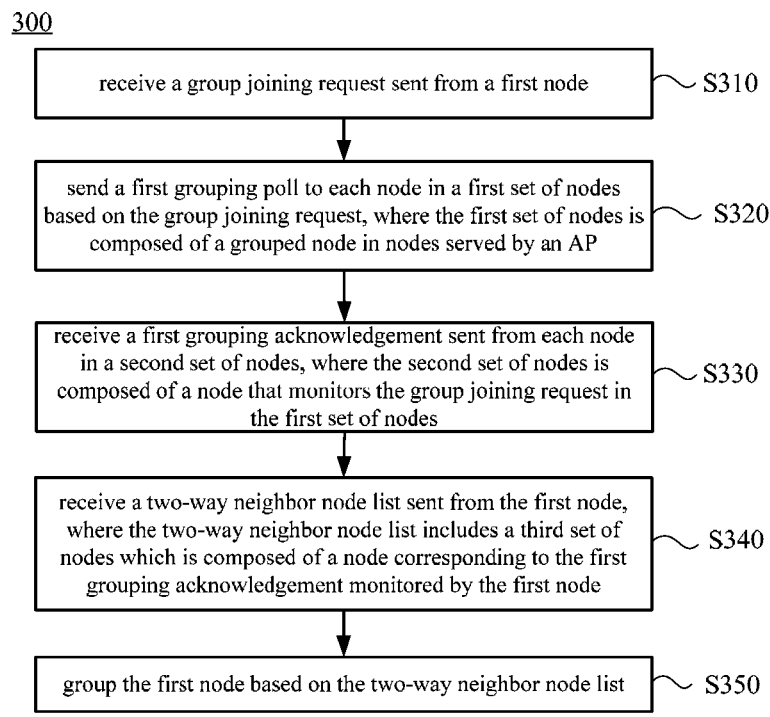
FIG. 14 is a schematic flow chart of a method for grouping a node provided according to another embodiment of the disclosure.

FIG. 14 is a schematic flow chart of a method 300 for grouping a node provided according to an embodiment of the disclosure. The method may be implemented by an AP. As shown in FIG. 14, the method 300 includes steps 310, 320, 330, 340 and 350 as follows.

S310 may include receiving a group joining request sent from a first node.

S320 may include sending a first grouping poll to each node in a first set of nodes based on the group joining request, where the first set of nodes is composed of grouped nodes in nodes served by the AP.

S330 may include receiving a first grouping acknowledgement sent from each node in a second set of nodes, where the second set of nodes is composed of the node that monitors the group joining request in the first set of nodes.

S340 may include receiving a two-way neighbor node list sent from the first node, where the two-way neighbor node list includes a third set of nodes, and the third set of node is composed of the node corresponding to the first grouping acknowledgement monitored by the first node.

S350 may include grouping the first node based on the two-way neighbor node list.

The AP may send the first grouping poll to each node in the first set of nodes after receiving the group joining request sent from the first node, where the first set of nodes is composed of grouped nodes in nodes served by the AP. The second set of nodes, which is composed of the node that monitors the group joining request in the second set of nodes, sends to the AP the first grouping acknowledgement. The first node monitors the first grouping acknowledgement sent from the node in the second set of nodes and sends to the AP the two-way neighbor node list, where the two-way neighbor node list includes a third set of nodes which is composed of the node corresponding to the first grouping acknowledgement monitored by the first node. The AP groups the first node based on the two-way neighbor node list after receiving the two-way neighbor node list sent from the first node.

Therefore, in the method for grouping the node provided according to the embodiment of the disclosure, nodes in each group are neighbor nodes with each other by grouping the nodes based on the two-way neighbor node lists of the nodes, thereby reducing the probability of hidden terminals in the large scale network and solving the problems such as contention conflict and low network efficiency.

Furthermore, in an embodiment of the disclosure, the neighbor node information may be collected by monitoring the grouping acknowledgement sent from the polled node to the AP, thereby reducing the probability of hidden terminals.

In an embodiment of the disclosure, the AP may check the existing grouping after receiving the two-way neighbor node list sent from the first node, and then the first node may be grouped into such a group that all the nodes in this group are the two-way neighbor nodes of the first node; and the first node may be grouped into a group which includes the least number of nodes in a case that nodes in multiple groups all belong to the two-way neighbor node list of the first node; or the first node itself may be grouped into an independent group in a case that there is no such a group that all the nodes in this group are the two-way neighbor nodes of the first node.

In an embodiment of the disclosure, the group joining request sent from the first node may be an association request in a case that the first node is associated with the AP, or may be a group joining request for joining into a group sent after the first node is associated with the AP.

Figure 15:
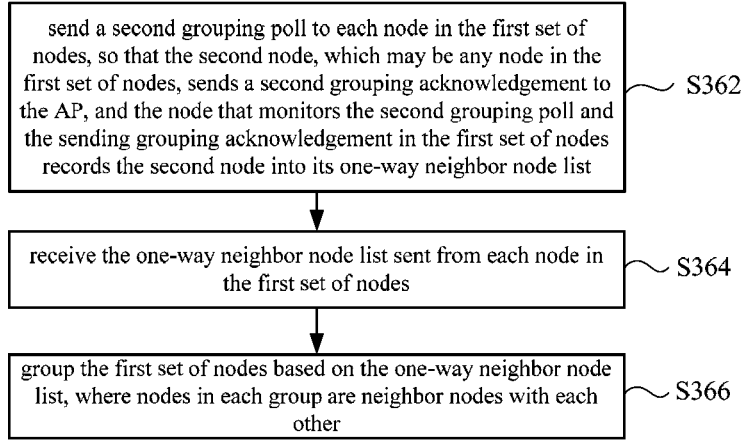
FIG. 15 is a schematic flow chart of a method for grouping a node provided according to another embodiment of the disclosure.

In an embodiment of the disclosure, as shown in FIG. 15, before the receiving the group joining request sent from the first node in S110, the method 300 may further include steps 362, 364 and 366 as follows.

S362 may include sending a second grouping poll to each node in the first set of nodes, so that the second node, which may be any node in the first set of nodes, may send a second grouping acknowledgement to the AP, and the node that monitors the second grouping poll and the second grouping acknowledgement in the first set of nodes records the second node into its one-way neighbor node list.

S364 may include receiving the one-way neighbor node list sent from each node in the first set of nodes.

S366 may include grouping the first set of nodes based on the one-way neighbor node list, where the nodes in each group are neighbor nodes with each other.

That is, the AP sends the second grouping poll to each node in the first set of nodes. The second node, which may be any node in the first set of nodes, may send the second grouping acknowledgement to the AP after receiving the second grouping poll. The node that monitors the second grouping poll and the second grouping acknowledgement in the first set of nodes records the second node into its one-way neighbor node list. Each node in the first set of nodes sends the one-way neighbor list to the AP, and then the AP may group the first set of nodes after receiving the one-way neighbor node list sent from each node in the first set of nodes, where the nodes in each group are neighbor nodes with each other.

Therefore, in the embodiment of the disclosure, the time cost of grouping may be reduced by grouping multiple nodes at a time and grouping a single node independently.

In the embodiment of the disclosure, the nodes in each group are neighbor nodes with each other, i.e., each node is the two-way neighbor node of the other node, and there is no hidden terminal between any two nodes.

In an embodiment of the disclosure, the AP may group all the nodes in the first set of nodes after receiving the one-way neighbor node list sent from each node in the first set of nodes, and the process of grouping may include:

a) generating a directed graph based on the received one-way neighbor node lists of all the nodes, and drawing a directed relationship of these nodes in the graph;

b) selecting a node which has the least number of the two-way neighbor nodes from all the nodes based on the directed graph and establishing a first group;

c) selecting the node which has the least number of the two-way neighbor nodes from the rest of the nodes and checking the existing grouping; grouping the node into such a group that all nodes in the group are the two-way neighbor nodes of the node; and in a case that there have multiple groups that all nodes in these groups are the two-way neighbor nodes of the node, grouping the node into a group which has the least number of nodes in the multiple groups; and establishing a new group for the node in a case that there is no such a group that all nodes in the group are the two-way neighbor nodes of the node; and d) performing step c until all the nodes are grouped.

It should be understood that the foregoing process of grouping is only an embodiment of the disclosure, the disclosure is not limited thereto, and the grouping may be implemented in other ways.

It should be understood that, in an embodiment of the disclosure, the first set of nodes may be grouped in other ways. For example, a node in the first set of nodes may be grouped into a group first, and then S310, S320, S330, S340 and S350 in the method 300 may be performed in sequence, i.e., each node may be grouped respectively. For another example, the second node, which may be any node in the first set of nodes, may collect information of hidden nodes and report the information of hidden nodes to the AP, and then the AP may group the nodes which have no hidden relationship into a group after receiving the information of hidden nodes reported by all the nodes, that is, the nodes in a same group are neighbor nodes with each other.

In an embodiment of the disclosure, the receiving the one-way neighbor node list sent from each node in the first set of nodes may include:

receiving the one-way neighbor node list sent from each node in the first set of nodes in an order that the second grouping poll is received.

That is, each node in the first set of nodes sends to the AP the one-way neighbor node list in an order of being polled, thereby avoiding signaling conflict caused by centralized reporting of the one-way neighbor node lists.

In an embodiment of the disclosure, the sending the first grouping poll to each node in the first set of nodes in S320 includes:

sending, to each node in the first set of nodes, a first grouping poll indicated by a Type field, a Subtype field and a More Frag field included in a control frame.

The receiving the first grouping acknowledgement sent from each node in the second set of nodes to the AP in S330 includes:

receiving the first grouping acknowledgement sent from each node in the second set of nodes to the AP and indicated by a Type field, a Subtype field and a More Frag field included in a control frame.

The sending the second grouping poll to each node in the first set of nodes in S362 includes:

sending, to each node in the first set of nodes, a second grouping poll indicated by a Type field, a Subtype field and a More Frag field included in a control frame.

The second grouping acknowledgement is indicated by a Type field, a Subtype field and a More Frag field included in a control frame.

In an embodiment of the disclosure, the first and the second grouping polls may be indicated by the control frame; and the first and the second grouping acknowledgements may also be indicated by the control frame. For ease of description, the frame configured to indicate the first or the second grouping polls may be referred to as a grouping-poll frame, and the frame configured to indicate the first or the second grouping acknowledgements may be referred to as a grouping-ACK frame. It may be understood that the naming of the grouping-poll frame and the grouping-ACK frame is only for ease of description, and the disclosure is not limited thereto.

Figure 16A:
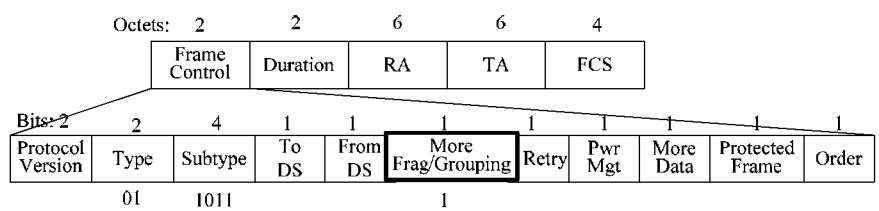
FIG. 16A and FIG. 16B are format charts of a control frame provided according to an embodiment of the disclosure.
Figure 16B:
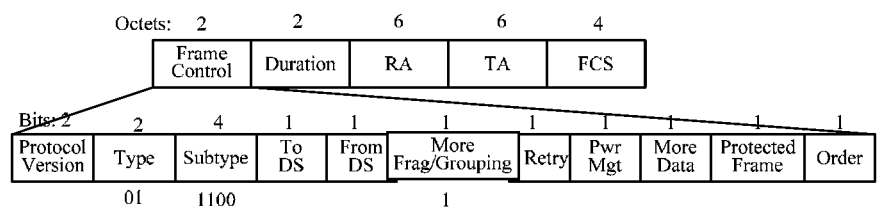

In the conventional technology, the control frame generally includes: a Frame Control, a Duration, a RA, a TA and a FCS. The Frame Control includes a Protocol Version, a Type, a Subtype, a to Distributed System (abbreviated as to DS), a From Distributed System (abbreviated as From DS), a More Frag, a Retry, a Power Mangent (abbreviated as Pwr Mgt), a More Data, a Protected Frame and an Order, as shown in FIG. 16A and FIG. 16B. A Request to Send (abbreviated as RTS) frame and a Clear to Send (abbreviated as CTS) frame are both very short frames, and usually may not adopt the frag mechanism, hence the "More Frag" field in the Frame Control domain may be given a double meaning, i.e., More Frag/Grouping. In a case that it is detected from the Type field of the Frame Control field that the frame is a RTS or CTS frame, the "More Frag/Grouping" indicates whether the frame is a RTS (CTS) frame or a grouping-poll (grouping-ACK) frame.

For example, as shown in FIG. 16A, the frame may be a RTS frame or a grouping-poll frame in a case that the Type field is 01 and the Subtype field is 1011. In this case, the frame is a grouping poll frame in a case that the More Frag/Grouping is 1, and the frame is a RTS frame in a case that the More Frag/Grouping is 0.

In the same way, as shown in FIG. 16B, the frame may be a CTS frame or a grouping-ACK frame in a case that the Type field is 01 and the Subtype field is 1100. In this case, the frame is a grouping-ACK frame in a case that the More Frag/Grouping is 1, and the frame is a CTS frame in a case that the More Frag/Grouping is 0. The contents and meanings of other fields in the frames shown in FIG. 16A and FIG. 16B may refer to the conventional technology, and detailed description thereof is omitted herein for concision.

It may be understood that, the values of the foregoing fields are only examples, and the disclosure is not limited thereto.

In an embodiment of the disclosure, the receiving a two-way neighbor node list sent from the first node in S340 includes:

receiving the two-way neighbor node list carried in a data frame and sent from the first node, where a Type field, a Subtype field and a More Data field in the data frame indicate that the data frame carries the two-way neighbor node list.

The receiving the one-way neighbor node list sent from each node in the first set of nodes in S364 includes:

receiving the one-way neighbor node list carried in a data frame and sent from each node in the first set of nodes, where a Type field, a Subtype field and a More Data field in the data frame indicate that the data frame carries the one-way neighbor node list.

Figure 17:
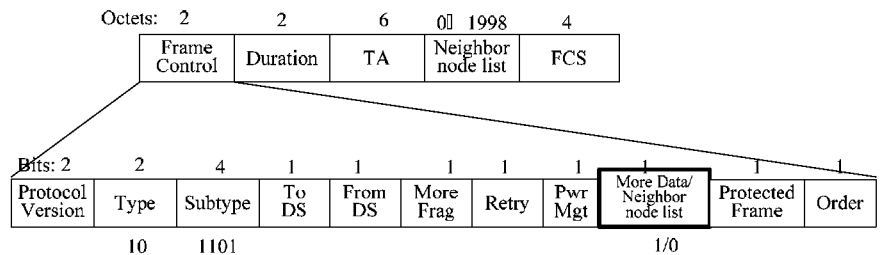
FIG. 17 is a format chart of a data frame provided according to an embodiment of the disclosure.

In the conventional technology, the data frame generally includes: a Frame Control, a Duration, a RA, a TA, a body and a FCS. The Frame Control includes a Protocol Version, a Type, a Subtype, a to Distributed System (abbreviated as to DS), a From Distributed System (abbreviated as From DS), a More Frag, a Retry, a Power Mangent (abbreviated as Pwr Mgt), a More Data, a Protected Frame and an Order. The More Data field in the data frame sent from the node to the AP is rarely used, so the More Data field is reused as a "More Data/B_Nei Tab" herein, where B_Nei Tab represents the neighbor node list. For example, as shown in FIG. 17, the frame is a neighbor node list sent from the node to the AP in a case that "Type" is 10 and "Subtype" is 1101, where the body may be the one-way or two-way neighbor node list. It is indicated that the node sends a two-way neighbor node list in a case that the "More Data/B_Nei Tab" field is 1 and sends a one-way neighbor node list in a case that the "More Data/B_Nei Tab" field is 0.

It should be understood that, the values of the foregoing fields are only examples and the disclosure is not limited thereto.

In an embodiment of the disclosure, the AP may inform the node of the group that the node belongs to via a broadcast frame after determining the group that the node belongs to.

The process of grouping provided according to the embodiment of the disclosure is described above, and the normal operation stage of the network after the nodes are grouped is described in detail below.

In an embodiment of the disclosure, the method 300 may further include:

sending to the node an access time period which only includes a CP, where the CP includes the access time divided for each group, so that the node may transmit data with the AP within the access time of the group that the node belongs to.

In an embodiment of the disclosure, before sending to the node the access time period which only includes the CP, the method may further include:

determining that there is a time idle of a sum of DIFS and CWmin in a channel.

In an embodiment of the disclosure, the CP may further include an access time which is not divided for any group, so that in a case that the node determines that the data is delay-sensitive service and transmission of the data is not completed within the access time of the group that the node belongs to in a first access time period, the node may transmit the data with the AP within the access time which is not divided for any group in the first access time period.

In an embodiment of the disclosure, the method 300 may further include:

sending to the node a TIM frame, where the TIM frame carries information of the node which has cache downlink data at the AP in each group.

The normal operation stage of the network after the grouping is described by the method 300, and the details may refer to the description of the normal operation stage of the network in the method 200, and detailed description thereof is omitted herein for concision.

Therefore, in the method for grouping the node provided according to the embodiment of the disclosure, nodes in each group are neighbor nodes with each other by grouping the node based on the two-way neighbor node list of the node, thereby reducing the probability of hidden terminals in the large scale network and solving the problems such as contention conflict and low network efficiency.

The method for grouping the node provided according to the embodiment of the disclosure is described from a perspective of the AP in conjunction with FIG. 14 to FIG. 17 as above, and the method for grouping the node provided according to the embodiment of the disclosure may be described in the following from a perspective of the first node.

Figure 18:
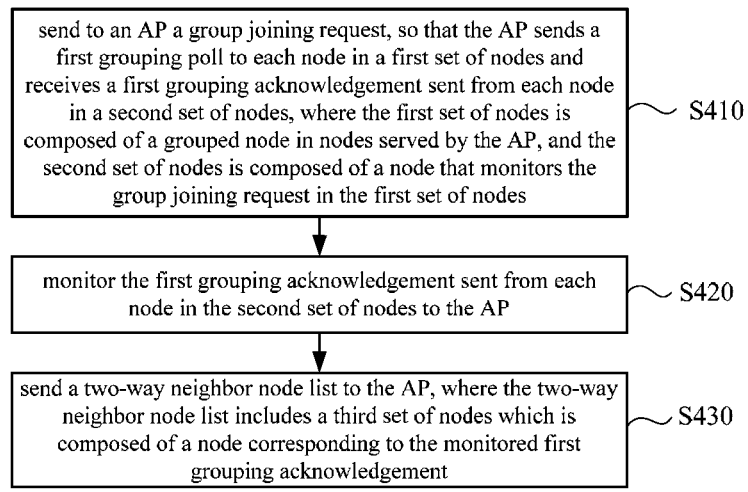
FIG. 18 is a schematic flow chart of a method for grouping a node provided according to another embodiment of the disclosure.

FIG. 18 illustrates a method for grouping a node provided according to an embodiment of the disclosure, which may be implemented by a node. As shown in FIG. 18, the method 400 includes steps 410, 420 and 430 as follows.

S410 may include sending to an AP a group joining request, so that the AP may send a first grouping poll to each node in a first set of nodes based on the group joining request and receive a first grouping acknowledgement sent from each node in a second set of nodes, where the first set of nodes is composed of the grouped node in nodes served by the AP, and the second set of nodes is composed of the node that monitors the group joining request in the first set of nodes.

S420 may include monitoring the first grouping acknowledgement sent from each node in the second set of nodes to the AP.

S430 may include sending a two-way neighbor node list to the AP, where the two-way neighbor node list includes a third set of nodes which is composed of the node corresponding to the first grouping acknowledgement that is monitored.

Therefore, in the method for grouping the node provided according to the embodiment of the disclosure, nodes in each group are neighbor nodes with each other by grouping the node based on the two-way neighbor node list of the node, thereby reducing the probability of hidden terminals in the large scale network and solving the problems such as contention conflict and low network efficiency.

In addition, in an embodiment of the disclosure, the neighbor node information may be collected completely by monitoring the grouping acknowledgement sent from the polled node to the AP, thereby reducing the probability of hidden terminals.

In an embodiment of the disclosure, the first grouping poll and the first grouping acknowledgement are carried in a Type field, a Subtype field and a More Data field included in the control frame.

In an embodiment of the disclosure, the sending the two-way neighbor node list to the AP in S430 includes:

sending to the AP the two-way neighbor node list carried in a data frame, where a Type field, a Subtype field and a More Data field in the data frame indicate that the data frame carries the two-way neighbor node list.

The process of grouping provided according to the embodiment of the disclosure is described above, and the normal operation stage of the network after the nodes are grouped is described in detail below.

In an embodiment of the disclosure, the method 400 may further include:

receiving a message including an access time period sent from the AP, where the access time period only includes a CP, and the CP includes the access time divided for each group;

determining the access time of the group that the node belongs to based on the access time period; and transmitting data with the AP within the access time of the group that the node belongs to.

In an embodiment of the disclosure, the method 400 may further include:

determining that the data is delay-sensitive service and transmission of the data is not completed within the access time of the group that the node belongs to in a first access time period; and transmitting the data with the AP within an access time which is not divided for any group in the first access time period.

In an embodiment of the disclosure, before transmitting the data with the AP within the access time of the group that the node belongs to, the method further includes:

receiving a TIM frame sent from the AP, where the TIM frame carries information of the node which has cache downlink data at the AP in each group; and determining that there is downlink cache data at the AP based on the TIM frame.

The normal operation stage of the network is described by the method 400, the details may refer to the description of the normal operation stage of the network in the method 100, and detailed description thereof is omitted herein for concision.

Therefore, in the method for grouping the node provided according to the embodiment of the disclosure, nodes in each group are neighbor node with each other by grouping the node based on the two-way neighbor node list of the node, thereby reducing the probability of hidden terminals in the large scale network and solving the problems such as contention conflict and low network efficiency.

The method for grouping the node provided according to the embodiment of the disclosure is described above in conjunction with FIG. 1 to FIG. 18, and then a node and an AP provided according to embodiments of the disclosure are described in the following in conjunction with FIG. 19 to FIG. 29.

Figure 19:
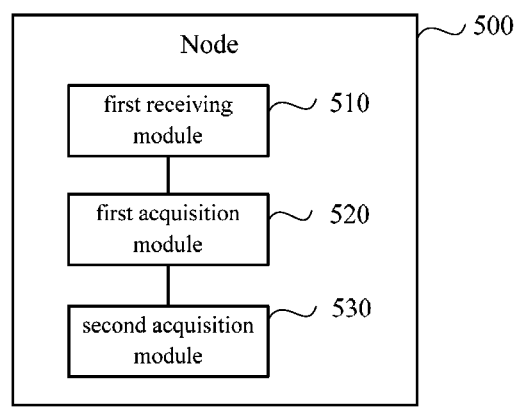
FIG. 19 is a schematic block diagram of a node provided according to an embodiment of the disclosure.

FIG. 19 is a schematic block diagram of a node 500 provided according to an embodiment of the disclosure. As shown in FIG. 19, the node 500 includes:

a first receiving module 510, configured to receive a grouping request sent from an AP;

a first acquisition module 520, configured to acquire a RSSI based on the grouping request received by the first receiving module 510; and a second acquisition module 530, configured to acquire an ID of a group that the node belongs to determined based on the RSSI acquired by the first acquisition module.

Therefore, for the node provided according to the embodiment of the disclosure, by grouping the node based on the RSSI, the problems such as contention conflict and low network efficiency in the large scale network may be solved, and unfair throughput caused by near-far effect may be avoided, thereby reducing the probability of hidden terminals.

Figure 20:
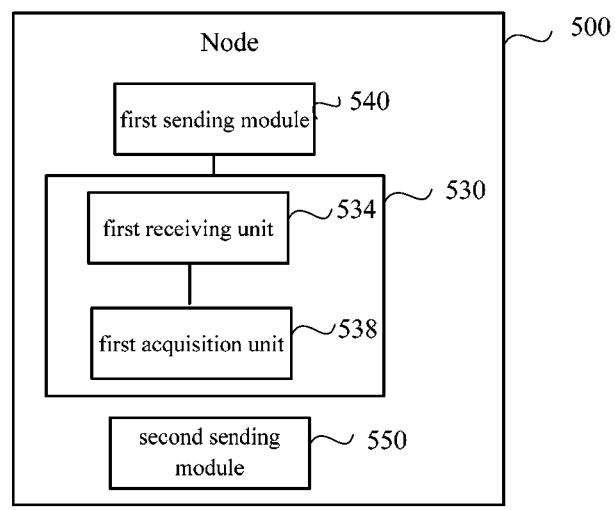
FIG. 20 is a schematic block diagram of a node provided according to another embodiment of the disclosure.

Optionally, as shown in FIG. 20, the node 500 provided according to an embodiment of the disclosure further includes:

a first sending module 540, configured to send the RSSI to the AP before the ID of the group that the node belongs to is determined based on the RSSI acquired by the first acquisition module 520.

Correspondingly, the second acquiring module 530 includes:

a first receiving unit 534, configured to receive a message including the ID of the group sent from the AP, where the ID of the group is determined by the AP based on the RSSI sent from the first sending module 540 and a preset RSSI grouping range; and a first acquisition unit 538, configured to acquire the ID of the group from the message including the ID of the group received by the second receiving unit 534.

Optionally, the second acquisition module 530 is configured to:

determine the ID of the group that the node belongs to based on the RSSI acquired by the first acquisition module 520 and the preset RSSI grouping range.

Correspondingly, as shown in FIG. 20, the node 500 further includes:

a second sending module 550, configured to send to the AP the message including the ID of the group acquired by the second acquisition module 530.

Optionally, the first receiving module 510 is configured to:

receive the grouping request indicated by a beacon frame and sent from the AP, where the body of the beacon frame carries the preset RSSI grouping range.

Optionally, the second sending module 550 is configured to:

send to the AP the message including the ID of the group within a period of time determined based on the ID of the group, a Distributed Coordination Function Inter-frame Space (DIFS) and a minimum value of Contention Window (CW) CWmin or within a preset Contention Period (CP).

In an embodiment of the disclosure, signaling conflict may be reduced by decentralizing the time when the node reports the ID of the group that the node belongs to.

Figure 21:
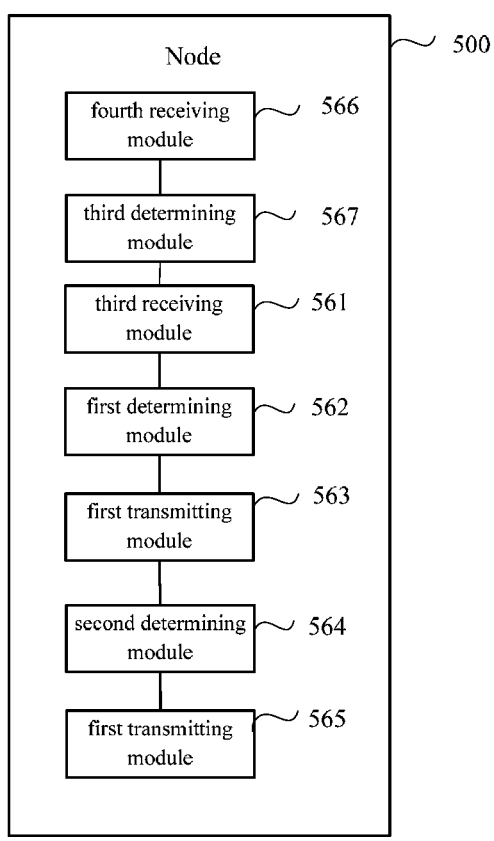
FIG. 21 is a schematic block diagram of a node provided according to another embodiment of the disclosure.

Optionally, as shown in FIG. 21, the node 500 further includes:

a third receiving module 561, configured to receive a message including an access time period sent from the AP, where the access time period only includes a CP, and the CP includes the access time divided for each group;

a first determining module 562, configured to determine the access time of the group that the node belongs to based on the access time period received by the third receiving module 561; and a first transmitting module 563, configured to transmit data with the AP within the access time of the group that the node belongs to determined by the first determining module 562.

Therefore, in the disclosure, the access time period only includes the CP, thereby avoiding the CFP in the conventional technology, taking full use of time, and reducing the time cost.

Optionally, as shown in FIG. 21, the node 500 further includes:

a second determining module 564, configured to determine that the data transmitted by the first transmitting module 563 is delay-sensitive service, and transmission of the data is not completed within the access time of the group that the node belongs to in a first access time period; and a second transmitting module 565, configured to transmit the data with the AP within the access time which is not divided for any group in the first access time period.

Therefore, in an embodiment of the disclosure, the average end-to-end transmission delay of the delay-sensitive service may be reduced effectively by setting a time for transmitting delay-sensitive service in the CP.

Optionally, as shown in FIG. 21, the node 500 further includes:

a fourth receiving module 566, configured to receive a TIM frame sent from the AP before the data is transmitted to the AP within the access time of the group that the node belongs to, where the TIM frame carries information of the node which has cache downlink data at the AP in each group; and a third determining module 567, configured to determine that there is downlink cache data at the AP based on the TIM frame received by the fourth receiving module 566.

The node 500 provided according to the embodiment of the disclosure may correspond to the node in the method 100 for grouping the node provided according to the embodiment of the disclosure, and the foregoing and other operations and/or functions of modules in the node 500 can realize the corresponding processes in the method 100 shown in FIG. 1 to FIG. 10, and detailed description thereof is omitted herein.

Therefore, for the node provided according to the embodiment of the disclosure, by grouping the nodes based on the RSSI, the problems such as contention conflict and low network efficiency in the large scale network may be solved, and unfair throughput caused by near-far effect may be avoided, thereby reducing the probability of hidden terminals.

The node 500 provided according to the embodiment of the disclosure is described above in conjunction with FIG. 19 to FIG. 21. An access point 600 provided according to an embodiment of the disclosure is described below in conjunction with FIG. 22 to FIG. 23.

Figure 22:
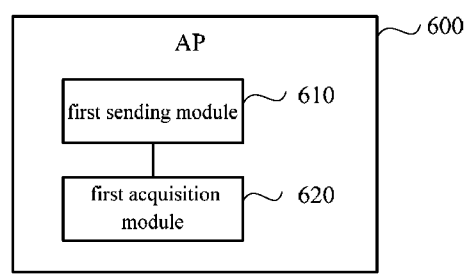
FIG. 22 is a schematic block diagram of an AP provided according to an embodiment of the disclosure.

FIG. 22 is a schematic block diagram of an access point 600 provided according to an embodiment of the disclosure. As shown in FIG. 22, the access point 600 includes:

a first sending module 610, configured to send to a node a grouping request, so that the node acquires a Received Signal Strength Indicator (RSSI) based on the grouping request; and a first acquisition module 620, configured to acquire an ID of a group that the node belongs to determined based on the RSSI.

Therefore, for the access point provided according to the embodiment of the disclosure, by grouping the nodes based on the RSSI, the problems such as contention conflict and low network efficiency in the large scale network may be solved, and unfair throughput caused by near-far effect may be avoided, thereby reducing the probability of hidden terminals.

Figure 23:
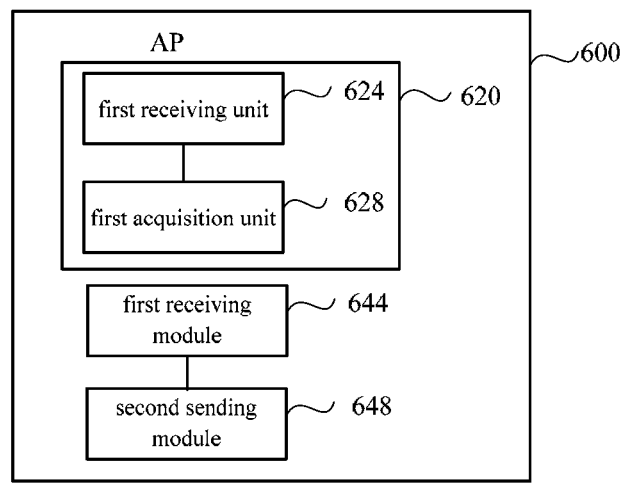
FIG. 23 is a schematic block diagram of an AP provided according to another embodiment of the disclosure.

Optionally, as shown in FIG. 23, the first acquisition module 620 includes:

a first receiving unit 624, configured to receive a message including the ID of the group sent from the node, where the ID of the group is determined by the node based on the RSSI and a preset RSSI grouping range; and a first acquisition unit 628, configured to acquire the ID of the group from the message including the ID of the group received by the first receiving unit 624.

Optionally, as shown in FIG. 23, the AP 600 further includes:

a first receiving module 644, configured to receive the RSSI sent from the node before the ID of the group that the node belongs to determined based on the RSSI is acquired by the first acquisition module.

Correspondingly, the first acquisition module 620 is configured to:

determine the ID of the group that the node belongs to based on the RSSI received by the second receiving module 644 and the preset RSSI grouping range.

Correspondingly, as shown in FIG. 23, the AP 600 further includes:

a second sending module 648, configured to send to the node a message including the ID of the group acquired by the first acquisition module 620.

Optionally, the first sending module 610 is configured to:

send to the node a grouping request indicated by a beacon frame, where the beacon frame carries the preset RSSI grouping range.

Figure 24:
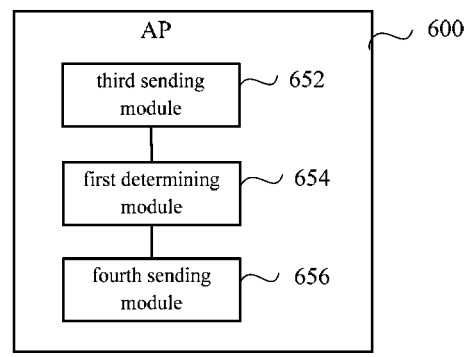
FIG. 24 is a schematic block diagram of an AP provided according to another embodiment of the disclosure.

Optionally, as shown in FIG. 24, the AP 600 further includes:

a third sending module 652, configured to send to the node an access time period which only includes a CP, where the CP include the access time divided for each group, so that the node may transmit data with the AP within the access time of the group that the node belongs to.

Therefore, in the disclosure, the access time period only includes the CP, thereby avoiding the CFP in the conventional technology, taking full use of time, and reducing the time cost.

Optionally, as shown in FIG. 24, the AP 600 further includes:

a first determining module 654, configured to determine there is a time idle of a sum of Distributed Coordination Function Inter-frame Space (DIFS) and a minimum value of Contention Window (CW) CWmin in a channel before the access time period which only includes the CP is sent from the third sending module 652 to the node.

Therefore, the grouping access time may be reset in a case that there is an idle in the group, thereby taking full use of time and reducing the time cost.

Optionally, the CP may further include an access time which is not divided for any group, so that in a case that the node determines that the data is delay-sensitive service and the transmission of the data is not completed within the access time of the group that the node belongs to in a first access time period, the node may transmit the data with the AP within the access time which is not divided for any group in the first access time period.

Therefore, in an embodiment of the disclosure, the average end-to-end transmission delay of the delay-sensitive service may be reduced effectively by setting a time for transmitting the delay-sensitive service in the CP.

Optionally, as shown in FIG. 24, the AP 600 further includes:

a fourth sending module 656, configured to send to the node a Traffic Indication Map (TIM) frame, where the TIM frame carries information of the node which has cache downlink data at the AP in each group.

The AP 600 provided according to the embodiment of the disclosure may correspond to the AP in the method 200 for grouping the node provided according to the embodiment of the disclosure, and the foregoing and other operations and/or functions of modules in the AP 600 can realize the corresponding processes in the method 200 shown in FIG. 11 to FIG. 13, and detailed description thereof is omitted herein for concision.

Therefore, for the AP provided according to the embodiment of the disclosure, by grouping the nodes based on the RSSI, the problems such as contention conflict and low network efficiency in the large scale network may be solved, and unfair throughput caused by near-far effect may be avoided, thereby reducing the probability of hidden terminals.

An AP 700 provided according to an embodiment of the disclosure is described below in conjunction with FIG. 25 to FIG. 27.

Figure 25:
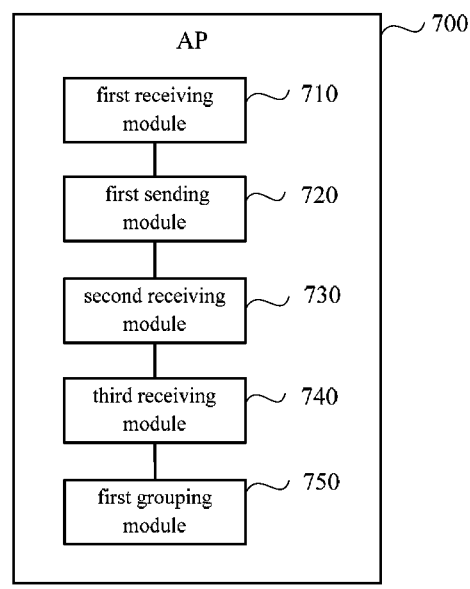
FIG. 25 is a schematic block diagram of an AP provided according to another embodiment of the disclosure.

FIG. 25 is a schematic block diagram of an AP 700 provided according to an embodiment of the disclosure. As shown in FIG. 25, the AP 700 includes:

a first receiving module 710, configured to receive a group joining request sent from a first node;

a first sending module 720, configured to send a first grouping poll to each node in a first set of nodes based on the group joining request received by the first receiving module 710, where the first set of nodes is composed of grouped nodes in nodes served by the AP;

a second receiving module 730, configured to receive a first grouping acknowledgement sent from each node in a second set of nodes, where the second set of nodes is composed of the node that monitors the group joining request sent from the first sending module 720 in the first set of nodes;

a third receiving module 740, configured to receive a two-way neighbor node list sent from the first node, where the two-way neighbor node list includes information of a third set of nodes which is composed of the node corresponding to the first grouping acknowledgement monitored by the first node; and a first grouping module 750, configured to group the first node based on the two-way neighbor node list received by the third receiving module 740.

Therefore, in the method for grouping the node provided according to the embodiment of the disclosure, nodes in each group are neighbor nodes with each other by grouping the node based on the two-way neighbor node list of the node, thereby reducing the probability of hidden terminals in the large scale network and solving the problems such as contention conflict and low network efficiency.

Figure 26:
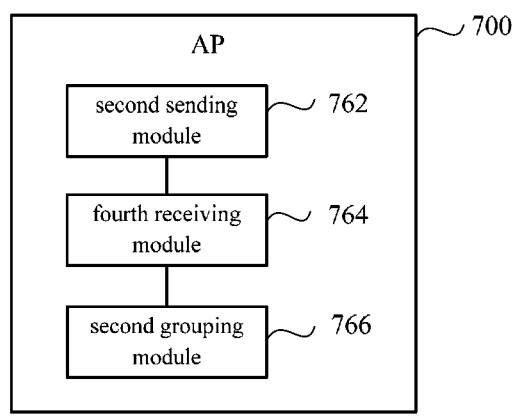
FIG. 26 is a schematic block diagram of an AP provided according to another embodiment of the disclosure.

Optionally, as shown in FIG. 26, the AP 700 includes:

a second sending module 762, configured to send a second grouping poll to each node in the first set of nodes before the group joining request sent from the first node is received by the first receiving node 710, so that the second node, which may be any node in the first set of nodes, may send a second grouping acknowledgement to the AP, and the node that monitors the second grouping poll and the second grouping acknowledgement in the first set of nodes may record information of the second node into its one-way neighbor node list;

a fourth receiving module 764, configured to receive the one-way neighbor node list sent from each node in the first set of nodes; and a second grouping module 766, configured to group the first set of nodes based on the one-way neighbor node list received by the fourth receiving module 764, where the nodes in each group are neighbor nodes with each other.

Therefore, in the embodiment of the disclosure, the time cost of grouping may be reduced by grouping multiple nodes at a time and grouping a single node independently.

Optionally, the fourth receiving unit 764 is configured to:

receive the one-way neighbor node list which is sent from each node in the first set of nodes in an order that the second grouping poll sent from the second sending module 762 is received.

Optionally, the first sending module 720 is configured to:

send to each node in the first set of nodes, the first grouping poll indicated by a Type field, a Subtype field and a More Frag file included in a control frame.

The second receiving module 730 is configured to:

receive the first grouping acknowledgement sent from each node in the second set of nodes to the AP and indicated by the Type field, the Subtype field and the More Frag field included in the control frame.

The third receiving module 740 is configured to:

receive the two-way neighbor node list carried in the data frame and sent from the first node, where the Type field, the Subtype field and the More Data field in the data frame indicate that the data frame carries the two-way neighbor node list.

Optionally, the second sending module 762 is configured to:

send, to each node in the first set of nodes, the second grouping poll indicated by a Type field, a Subtype field and a More Frag field included in a control frame.

The second grouping acknowledgement is indicated by a Type field, a Subtype field and a More Frag field included in a control frame.

The fourth receiving module 764 is configured to:

receive the one-way neighbor node list carried in the data frame and sent from each node in the first set of nodes, where the Type field, the Subtype field and the More Data field in the data frame indicate that the data frame carries the one-way neighbor node list.

Figure 27:
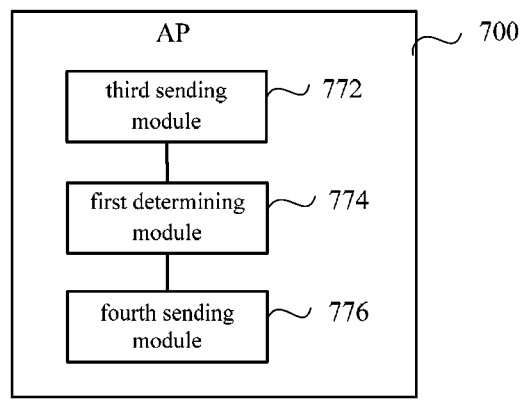
FIG. 27 is a schematic block diagram of an AP provided according to another embodiment of the disclosure.

Optionally, as shown in FIG. 27, the AP 700 further includes:

a third sending module 772, configured to send to the node an access time period which only includes a CP, where the CP includes the access time divided for each group, so that the node may transmit data with the AP within the access time of the group that the node belongs to.

Therefore, in the disclosure, the access time period only includes the CP, thereby avoiding the CFP in the conventional technology, taking full use of time, and reducing the time cost.

Optionally, as shown in FIG. 27, the AP 700 further includes:

a first determining module 774, configured to determine a time idle of a sum of Distributed Coordination Function Inter-frame Space (DIFS) and a minimum value of Contention Window (CWmin) in a channel before the access time period which only includes the CP is sent from the third sending module 772 to the node.

Therefore, the grouping access time may be reset in a case that there is an idle in the group, thereby taking full use of time and reducing the time cost.

Optionally, the CP may further include an access time which is not divided for any group, so that in a case that the node determines that the data is delay-sensitive service and the transmission of the data is not completed within the access time of the group that the node belongs to in a first access time period, the node may transmit data with the AP within the access time which is not divided for any group in the first access time period.

Therefore, in the embodiment of the disclosure, the average end-to-end transmission delay of the delay-sensitive service may be reduced effectively by setting a time for transmitting the delay-sensitive service in the CP.

Optionally, as shown in FIG. 27, the AP 700 further includes:

a fourth sending module 774, configured to send to the node a Traffic Indication Map (TIM) frame, where the TIM frame carries information of the node which has cache downlink data at the AP in each group.

The AP 700 provided according to the embodiment of the disclosure may correspond to the AP in the method 300 for grouping the node provided according to the embodiment of the disclosure, and the foregoing and other operations and/or functions of modules in the AP 700 can realize the corresponding processes in the method 300 shown in FIG. 14 to FIG. 17, and detailed description thereof is omitted herein for concision.

Therefore, in the method for grouping the node provided according to the embodiment of the disclosure, nodes in each group are neighbor nodes with each other by grouping the node based on the two-way neighbor node list of the node, thereby reducing the probability of hidden terminals in the large scale network and solving the problems such as contention conflict and low network efficiency.

Figure 28:
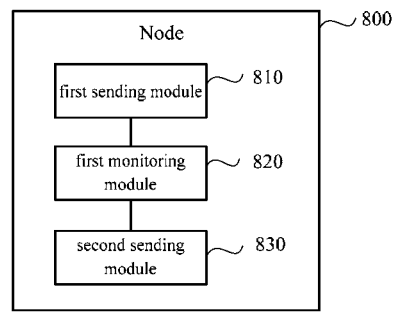
FIG. 28 is a schematic block diagram of a node provided according to another embodiment of the disclosure.

FIG. 28 is a schematic block diagram of a node 800 provided according to an embodiment of the disclosure. As shown in FIG. 28, the node 800 includes:

a first sending module 810, configured to send to an AP a group joining request, so that the AP may send a first grouping poll to each node in a first set of nodes based on the group joining request and receive a first grouping acknowledgement sent from each node in a second set of nodes, where the first set of nodes is composed of grouped nodes in nodes served by the AP, and the second set of nodes is composed of the node that monitors the group joining request in the first set of nodes;

a first monitoring module 820, configured to monitor the first grouping acknowledgement sent from each node in the second set of nodes to the AP; and a second sending module 830, configured to send a two-way neighbor node list to the AP, where the two-way neighbor node list includes a third set of nodes which is composed of a node corresponding to the first grouping acknowledgement monitored by the first monitoring module 820.

Therefore, in the method for grouping the node provided according to the embodiment of the disclosure, nodes in each group are neighbor nodes with each other by grouping the node based on the two-way neighbor node list of the node, thereby reducing the probability of hidden terminals in the large scale network and solving the problems such as contention conflict and low network efficiency.

Optionally, the first grouping poll and the first grouping acknowledgement are indicated by the Type field, the Subtype field and the More Data field included in the control frame.

The second sending module 830 is configured to:

send to the AP the two-way neighbor node list carried in the data frame, where the Type field, the Subtype field and the More Data field in the data frame indicate that the data frame carries the two-way neighbor node list.

Figure 29:
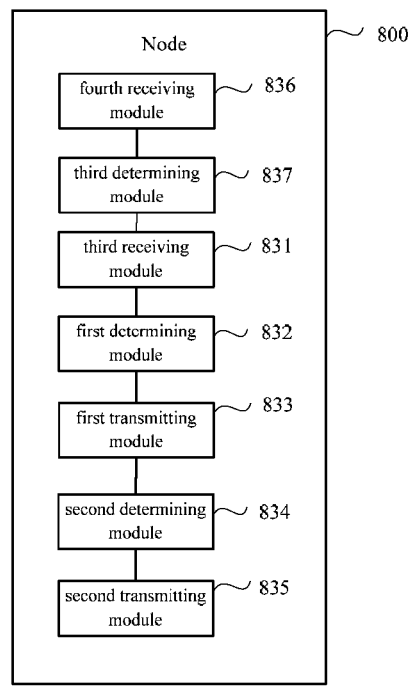
FIG. 29 is a schematic block diagram of a node provided according to another embodiment of the disclosure.

Optionally, as shown in FIG. 29, the node 800 further includes:

a third receiving module 831, configured to receive a message including an access time period sent from the AP, where the access time period only includes a CP, and the CP includes the access time divided for each group;

a first determining module 832, configured to determine the access time of the group that the node belongs to based on the access time period received by the third receiving module 562; and a first transmitting module 833, configured to transmit data with the AP within the access time of the group that the node belongs to determined by the first determining module 564.

Therefore, in the disclosure, the access time period only includes the CP, thereby avoiding the CFP in the conventional technology, taking full use of time, and reducing the time cost.

Optionally, as shown in FIG. 29, the node 800 further includes:

a second determining module 834, configured to determine that the data transmitted by the first transmitting module 833 is delay-sensitive service and transmission of the data is not completed within the access time of the group that the node belongs to in a first access time period; and a second transmitting module 835, configured to transmit data to the AP within the access time which is not divided for any group in the first access time period.

Therefore, in the embodiment of the disclosure, the average end-to-end transmission delay of the delay-sensitive service may be reduced effectively by setting a time for transmitting the delay-sensitive service in the CP.

Optionally, as shown in FIG. 29, the node 800 further includes:

a fourth receiving module 836, configured to receive a Traffic Indication Map (TIM) frame sent from the AP before the data is transmitted to the AP within the access time of the group that the node belongs to, where the TIM frame carries information of the node which has cache downlink data at the AP in each group; and a third determining module 837, configured to determine that there is downlink cache data at the AP based on the TIM frame received by the fourth receiving module 836.

The node 800 provided according to the embodiment of the disclosure may correspond to the node in the method 400 for grouping the node provided according to the embodiment of the disclosure, and the foregoing and other operations and/or functions of modules in the node 800 can realize the corresponding processes in the method 400 shown in FIG. 18, and detailed description thereof is omitted herein for concision.

Therefore, in the method for grouping the node provided according to the embodiment of the disclosure, nodes in each group are neighbor nodes with each other by grouping the node based on the two-way neighbor node list of the node, thereby reducing the probability of hidden terminals in the large scale network and solving the problems such as contention conflict and low network efficiency.

It may be understood by those skilled in the art that, the units and algorithm steps disclosed in the embodiment of the disclosure may be realized by electronic hardware or integration of computer software and electronic hardware. Whether the functions are implemented by electronic hardware or by integration of computer software and electronic hardware is determined based on the specific application and the design constrains of the technical solution. Those skilled in the art may adopt different ways to realize the described functions for each specific application, and the implementation is within the protection scope of the disclosure.

It may be understood by those skilled in the art that, the working process of the foregoing system, apparatus and unit may refer to the corresponding process described in the foregoing method embodiments, and detailed description thereof is omitted herein.

It may be understood that, the disclosed system, apparatus and method provided in the embodiments of the application may be realized in other ways. For example, the apparatus set forth is only an illustrative example. For example, the division of units is only a logical function division, and there may be other divisions in implementation. For example, multiple units or components may be combined or integrated into another system, and certain features may be omitted or not be implemented. In addition, a coupling or a direct coupling or a communication connection described may be an indirect coupling or communication connection via a certain interface, apparatus or unit, which may be an electronic or a mechanical coupling or communication connection, for example.

The units which are described as separated components may be or not be separated physically, and components which are illustrated as units may be or not be physical units, i.e., may be located in a certain position or be distributed in multiple network units. Part or all of the units may be adopted to realize the purpose of the embodiment according to actual needs.

In addition, the functional units in the embodiments of the disclosure may be integrated into a processing unit or may be independent from each other, and two or more units may be integrated into one unit.

The functions may be stored in a computer-readable storage medium in a case that the functions are realized via a software function unit and are sold and used as an independent product. In view of this, the essential technical solution of the disclosure or the part of the disclosure which contributes to the prior art or part of the technical solution may be implemented by a software product. The computer software product may be stored in a storage medium and includes several instructions, to enable a computer device (for example, a personal computer, a server or a network device) to implement all or part of steps of the method provided according to each embodiment of the disclosure. The foregoing storage medium includes medium which can store program codes, such as a USB flash disk, a mobile hard disk drive, a Read-Only Memory (ROM), a Random Access Memory (RAM), a diskette or an optical disk.

The above are only embodiments of the invention, and the protection scope of the invention is not limited thereto. Modifications and substitutions which can be made by those skilled in the art without any creative work within the technical scope of the disclosure all belong to the protection scope of the invention. Therefore, the protection scope of the invention is interpreted by the claims.

What is claimed is:

1. A method for grouping a node, comprising:
   receiving a group joining request sent from a first node;
   sending a first grouping poll to each node in a first set of nodes based on the group joining request, wherein the first set of nodes is composed of a grouped node in nodes served by an Access point (AP);
   receiving a first grouping acknowledgement sent from each node in a second set of nodes, wherein the second set of nodes is composed of a node that monitors the group joining request in the first set of nodes;
   receiving a two-way neighbor node list sent from the first node, wherein the two-way neighbor node list comprises a third set of nodes, and the third set of nodes is composed of a node corresponding to the first grouping acknowledgement monitored by the first node; and
   grouping the first node based on the two-way neighbor node list.

2. The method according to claim 1, wherein before the receiving the group joining request sent from the first node, the method further comprises:
   sending a second grouping poll to each node in the first set of nodes, to enable a second node, which is any node in the first set of nodes, to send a second grouping acknowledgement to the AP, and to enable a node that monitors the second grouping poll and the second grouping acknowledgement in the first set of nodes to record the second node into its one-way neighbor node list of the node;
   receiving a one-way neighbor node list sent from each node in the first set of nodes; and
   grouping the first set of nodes based on the one-way neighbor node list sent from each node, wherein nodes in each group are neighbor nodes with each other.

3. The method according to claim 2, wherein the receiving the one-way neighbor node list sent from each node in the first set of nodes comprises:
   receiving the one-way neighbor node list which is sent from each node in the first set of nodes in an order that the second grouping poll is received.

4. The method according to claim 3, wherein
   the sending the first grouping poll to each node in the first set of nodes comprises:
   sending to each node in the first set of nodes, the first grouping poll indicated by a Type field, a Subtype field and a More Frag field comprised in a control frame, and
   the receiving the first grouping acknowledgement sent from each node in the second set of nodes to the AP comprises:
   receiving the first grouping acknowledgement sent from each node in the second set of nodes to the AP and indicated by the Type field, the Subtype field and the More Frag field comprised in the control frame, and
   the receiving a two-way neighbor node list sent from the first node comprises:
   receiving the two-way neighbor node list carried in a data frame and sent from the first node, wherein a Type field, a Subtype field and a More Data field in the data frame indicate that the data frame carries the two-way neighbor node list.

5. The method according to claim 2, wherein
   the sending the second grouping poll to each node in the first set of nodes comprises:
   sending, to each node in the first set of nodes, the second grouping poll indicated by a Type field, a Subtype field and a More Frag field comprised in a control frame,
   wherein the second grouping acknowledgement is indicated by the Type field, the Subtype field and the More Frag field comprised in the control frame, and
   the receiving the one-way neighbor node list sent from each node in the first set of nodes comprises:
   receiving the one-way neighbor node list carried in a data frame and sent from each node in the first set of nodes, wherein a Type field, a Subtype field and a More Data field in the data frame indicate that the data frame carries the one-way neighbor node list.

6. The method according to claim 1, further comprising:
   sending to the node an access time period which only comprises a Contention Period (CP), wherein the CP comprises an access time divided for each group, to enable the node to transmit data with the AP within an access time of the group that the node belongs to.

7. The method according to claim 6, wherein the CP further comprises an access time which is not divided for any group, to enable the node to transmit the data with the AP within the access time which is not divided for any group in a first access time period, when the data is delay-sensitive service and transmission of the data is not completed within the access time of the group that the node belongs to in the first access time period.

8. A method for grouping a node, comprising:
   sending to an Access point (AP) a group joining request, to enable the AP to send a first grouping poll to each node in a first set of nodes based on the group joining request and receives a first grouping acknowledgement sent from each node in a second set of nodes, wherein the first set of nodes is composed of a grouped node in nodes served by the AP, and the second set of nodes is composed of a node that monitors the group joining request in the first set of nodes;
   monitoring the first grouping acknowledgement sent from each node in the second set of nodes to the AP; and
   sending a two-way neighbor node list to the AP, wherein the two-way neighbor node list comprises a third set of nodes, and the third set of nodes is composed of a node corresponding to the first grouping acknowledgement that is monitored.

9. The method according to claim 8, wherein the first grouping poll and the first grouping acknowledgement are indicated by a Type field, a Subtype field and a More Data field comprised in a control frame,
   the sending the two-way neighbor node list to the AP comprises:
   sending to the AP the two-way neighbor node list carried in a data frame, wherein a Type field, a Subtype field and a More Data field in the data frame indicate that the data frame carries the two-way neighbor node list.

10. The method according to claim 8, further comprising:
receiving a message comprising an access time period sent from the AP, wherein the access time period only comprises a Contention Period (CP), and the CP comprises an access time divided for each group;
determining the access time of the group that the node belongs to based on the access time period; and
transmitting data with the AP within the access time of the group that the node belongs to.

11. The method according to claim 10, further comprising:
determining that the data is delay-sensitive service and transmission of the data is not completed within the access time of the group that the node belongs to in a first access time period; and
transmitting the data with the AP within an access time which is not divided for any group in the first access time period.

12. An Access point (AP), comprising a processor and a non-transitory processor-readable medium having processor-executable instructions stored thereon, the processor-executable instructions including a plurality of modules, the modules including:
a first receiving module, configured to receive a group joining request sent from a first node;
a first sending module, configured to send a first grouping poll to each node in a first set of nodes based on the group joining request received by the first receiving module, wherein the first set of nodes is composed of a grouped node in nodes served by the AP;
a second receiving module, configured to receive a first grouping acknowledgement sent from each node in a second set of nodes, wherein the second set of nodes is composed of a node that monitors the group joining request sent from the first sending module in the first set of nodes;
a third receiving module, configured to receive a two-way neighbor node list sent from the first node, wherein the two-way neighbor node list comprises a third set of nodes, and the third set of node is composed of a node corresponding to the first grouping acknowledgement monitored by the first node; and
a first grouping module, configured to group the first node based on the two-way neighbor node list received by the third receiving module.

13. The AP according to claim 12, further comprising:
a second sending module, configured to send a second grouping poll to each node in the first set of nodes before the group joining request sent from the first node is received by the first receiving module, to enable a second node, which is any node in the first set of nodes, to send a second grouping acknowledgement to the AP, and to enable a node that monitors the second grouping poll and the second grouping acknowledgement in the first set of nodes to record the second node into its one-way neighbor node list;
a fourth receiving module, configured to receive the one-way neighbor node list sent from each node in the first set of nodes; and
a second grouping module, configured to group the first set of nodes based on the one-way neighbor node list received by the fourth receiving module, wherein nodes in each group are neighbor nodes with each other.

14. The AP according to claim 13, wherein the fourth receiving module is configured to:
receive the one-way neighbor node list which is sent from each node in the first set of nodes in an order that the second grouping poll sent from the second sending module is received.

15. The AP according to claim 14, wherein
the first sending module is configured to:
send to each node in the first set of nodes, the first grouping poll indicated by a Type field, a Subtype field and a More Frag field comprised in a control frame, and
the second receiving module is configured to:
receive the first grouping acknowledgement sent from each node in the second set of nodes to the AP and indicated by the Type field, the Subtype field and the More Frag field comprised in the control frame, and
the third receiving module is configured to:
receive the two-way neighbor node list carried in a data frame and sent from the first node, wherein a Type field, a Subtype field and a More Data field in the data frame indicate that the data frame carries the two-way neighbor node list.

16. The AP according to claim 13, wherein
the second sending module is configured to:
send to each node in the first set of nodes, the second grouping poll indicated by a Type field, a Subtype field and a More Frag field comprised in a control frame,
wherein the second grouping acknowledgement is indicated by the Type field, the Subtype field and the More Frag field comprised in the control frame, and
the fourth receiving module is configured to:
receive the one-way neighbor node list carried in a data frame and sent from each node in the first set of nodes, wherein a Type field, a Subtype field and a More Data field in the data frame indicate that the data frame carries the one-way neighbor node list.

17. The AP according to claim 12, further comprising:
a third sending module, configured to send to the node an access time period which only comprises a Contention Period (CP), wherein the CP comprises an access time divided for each group, to enable the node to transmit data with the AP within an access time of the group that the node belongs to.

18. The AP according to claim 17, wherein the CP further comprises an access time which is not divided for any group, to enable the node to transmit the data with the AP within the access time which is not divided for any group in a first access time period, when the data is delay-sensitive service and transmission of the data is not completed within the access time of the group that the node belongs to in the first access time period.

19. A node, comprising a processor and a non-transitory processor-readable medium having processor-executable instructions stored thereon, the processor-executable instructions including a plurality of modules, the modules including:
a first sending module, configured to send to an Access point (AP) a group joining request, to enable the AP to send a first grouping poll to each node in a first set of nodes based on the group joining request and receives a first grouping acknowledgement sent from each node in a second set of nodes, wherein the first set of nodes is composed of a grouped node in nodes served by the AP, and the second set of nodes is composed of a node that monitors the group joining request in the first set of nodes;
a first monitoring module, configured to monitor the first grouping acknowledgement sent from each node in the second set of nodes to the AP; and a second sending module, configured to send a two-way neighbor node list to the AP, wherein the two-way neighbor node list comprises a third set of nodes, and the third set of nodes is composed of a node corresponding to the first grouping acknowledgement monitored by the first monitoring module.

20. The node according to claim 19, wherein the first grouping poll and the first grouping acknowledgement are indicated by a Type field, a Subtype field and a More Data field comprised in a control frame, and the second sending module is configured to:
send to the AP the two-way neighbor node list carried in a data frame, wherein a Type field, a Subtype field and a More Data field in the data frame indicate that the data frame carries the two-way neighbor node list.

21. The node according to claim 19, further comprising:
a first receiving module, configured to receive a message comprising an access time period sent from the AP, wherein the access time period only comprises a Contention Period (CP), and the CP comprises an access time divided for each group;
a first determining module, configured to determine the access time of the group that the node belongs to based on the access time period; and
a first transmitting module, configured to transmit data with the AP within the access time of the group that the node belongs to determined by the first determining module.

22. The node according to claim 21, further comprising:
a second determining module, configured to determine that the data transmitted by the first transmitting module is delay-sensitive service and transmission of the data is not completed within the access time of the group that the node belongs to in a first access time period; and
a second transmitting module, configured to transmit the data with the AP within an access time which is not divided for any group in the first access time period.

* * * * *